Jan. 19, 1960
M. E. IVY ET AL
2,921,672
PILL PACKAGE
Filed April 30, 1956
2 Sheets-Sheet 1
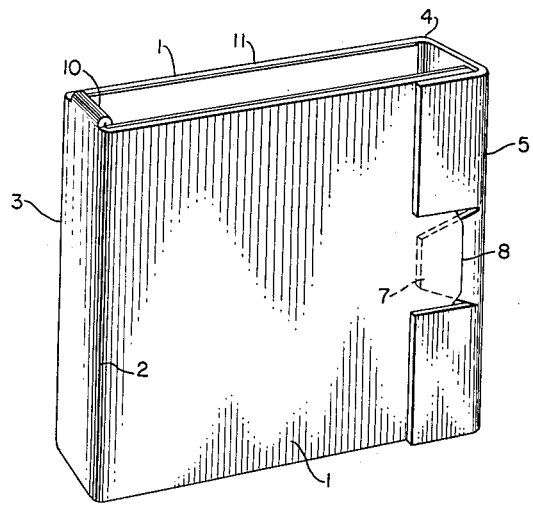
FIG. I
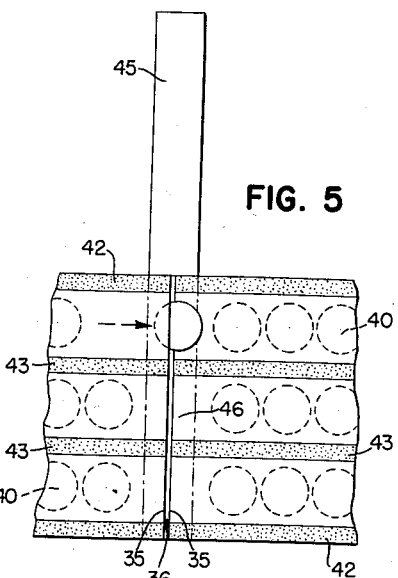
FIG. 5
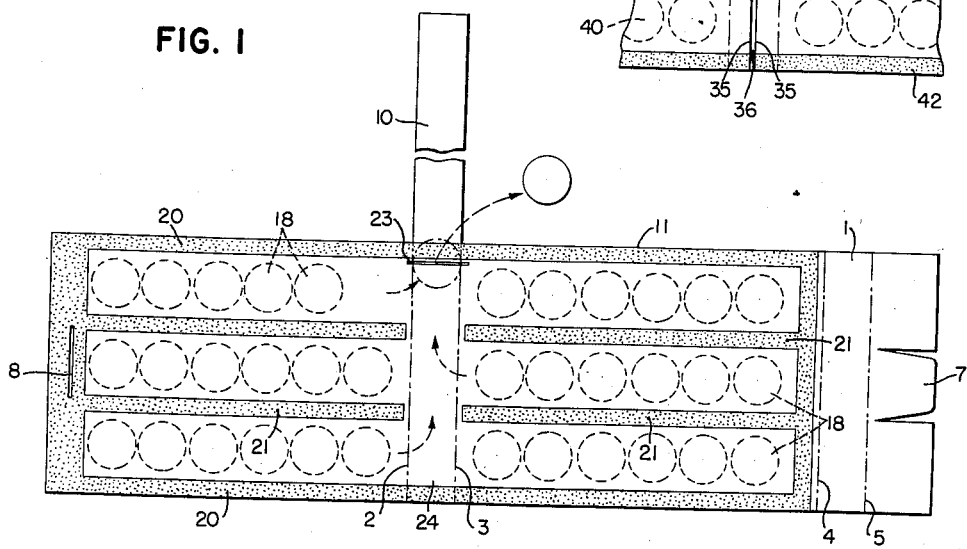
FIG. 2
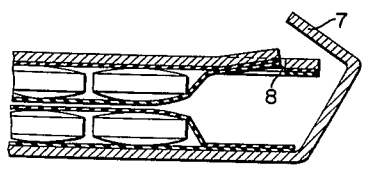
FIG. 8
INVENTOR.
DRURY R. BURTON
MARY ELLEN IVY
BY R. L. Miller
ATTORNEY Jan. 19, 1960
M. E. IVY ET AL
2,921,672
PILL PACKAGE
Filed April 30, 1956
2 Sheets-Sheet 2
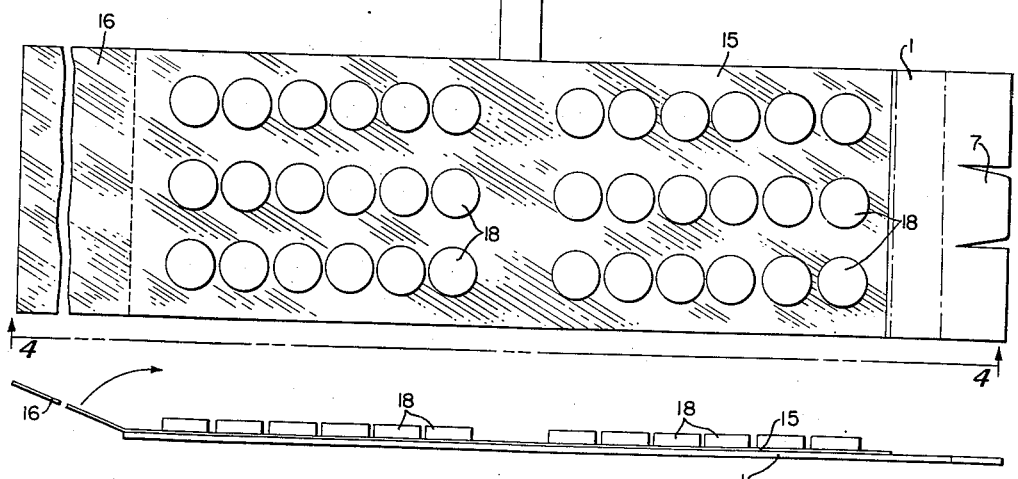
FIG. 3
FIG. 4
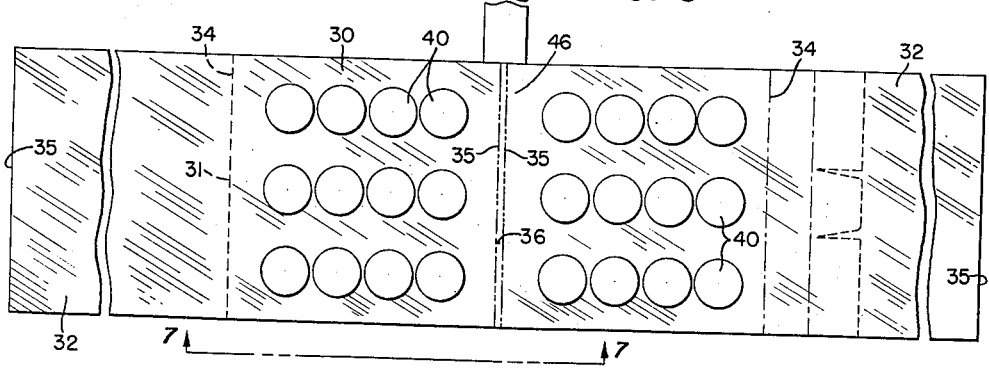
FIG. 6
FIG. 7
INVENTOR.
DRURY R. BURTON
MARY ELLEN IVY
BY
R.L. Miller
ATTORNEY United States Patent Office 2,921,672
Patented Jan. 19, 1960

2,921,672
PILL PACKAGE

Mary Ellen Ivy, Cuyahoga Falls, and Drury R. Burton, Uniontown, Ohio, assignors to The Goodyear Tire & Rubber Company, Akron, Ohio, a corporation of Ohio Application April 30, 1956, Serial No. 581,700

1 Claim. (Cl. 206—42)

This invention relates to a package in which pills or the like are arranged in series, and an opening is provided for dispensing the pills individually, one at a time.

The container for the package is formed of a relatively stiff backing material such as chipboard, plastic, or the like, and this is covered with a film material, preferably transparent. In the preferred form of the invention, the pills are packaged between two plies of the film.

The pills are arranged in a plurality of series within the container. These series may be in the form of spirals or ovals or the like, but the pills are preferably arranged in relatively straight lines. There is a common passageway at some place in the package which connects the various series, and there is an opening in the film which covers this passageway, through which the pills are dispensed. Ordinarily this passageway, or a portion of it, will be covered by a flap on the backing which is designed to hold the opening closed and keep the pills in their various series so that the pills of one series do not mingle with pills of another series.

The film is inert chemically to the pill compositions. Ordinarily it will be a highly moistureproof film which will protect the pills. In any event, it covers the pills and keeps them from collecting dirt. There are many transparent films on the market which may be used.

The invention will be further described in connection with the accompanying drawings in which—

Fig. 1 is a view in perspective of the closed package;

Fig. 2 is a plan view of the package of Fig. 1 opened up, with arrows showing how pills are dispensed;

Fig. 3 is a plan view showing how the package of Figs. 1 and 2 is made;

Fig. 4 is an edge view on the line 4—4 of Fig. 3;

Fig. 5 is a plan view of a modified form of package with its ends broken away, and showing the flap in full lines in its extended position, and in dotted lines in its fold-over position;

Fig. 6 is a plan view showing how the package of Fig. 5 is made, with the two end portions of the film shown in their extended position in full lines, and in dotted lines showing the ends of these portions folded inward in the position they occupy in the finished package;

Fig. 7 is an edge view on the line 7—7 of Fig. 6; and

Fig. 8 is a detail showing the closure means of the package.

The package of Fig. 1 is made from the chipboard backing 1 which is creased along the dot-dash lines 2, 3, 4 and 5. One end is cut to provide the tongue 7 and the other end is slotted at 8 to receive the tongue. The flap 10 extends perpendicularly from the side edge 11 of the backing and is slightly narrower than the distance between the creases 2 and 3. Before closing the container this flap 10 is folded downwardly and serves both to close the opening provided for dispensing the pills and to hold the pills in place in their various series.

Figs. 3 and 4 illustrate how the package is formed, using a heat-sealable film. It is to be understood that other film can be used and in that event a suitable adhesive will be used to unite the two plies of the film. The container of the drawings may be made of rubber hydrochloride film.

One end 15 of the film (substantially half of the film which is required to complete the container) is adhered to the chipboard by any suitable adhesive which may be a latex-type adhesive. The other end 16 of the film extends beyond the end of the chipboard. The pills 18 are arranged in series on top of the end 15 of the film. Then the end 16 of the film is folded over this with the edges and ends of both portions 15 and 16 coinciding.

Heat and pressure are then applied to the area 20 around the periphery of both portions of the film and to the areas 21 between the various series of pills, in order to enclose all of the pills and hold them in their various series.

Instead of using a single piece of film, and folding it, two separate pieces of film may be used. In that event the film adjacent the backing may be thinner and of a composition different from that of the outer film.

The slit 23 is cut in the passageway 24 which is common to the various series of the film, just within the sealed margin 20, at any suitable time, and preferably before the film and the chipboard are brought together.

After the pills have been sealed in place the flap 10 is folded over against the central passage 24. The two ends of the container are then folded forward and the package is completed by slipping the tongue 7 into the slot 8.

When a pill is wanted, the tongue is slipped out of the slot 8, the package is opened flat, and the flap 10 is lifted. Then, by the pressure and guidance of the thumb or other finger, a pill is manipulated out of one of the rows between the sealed areas 21 of the film into the passageway 24, and then out through the slit 23, which is in the top ply 16 of the film. It is easy to remove the pill through this slit because it is very close to the sealed border 20 of the film. Ordinarily the pills from the series nearest the slit 23 will be used first. Then, as indicated by the arrows, pills from the other series will be pushed into the area 24 and then out through the slit 23. When the desired one or more pills have been removed from the package, as desired, the flap 10 is folded back in place, the two halves of the container are folded together, and the tongue is again slipped into the slot 8.

Figs. 5-7 show a modified construction. The large rectangular film 30 is adhered to the chipboard backing 31 by a suitable adhesive. The film is arranged with its centerline at the centerline of the backing 31 so that when the ends 32 of the film are folded toward the middle, on the lines 34 which coincide with the respective ends of the chipboard backing, the outer edges 35 of the film will come close to meeting along the centerline of the package, but there will be a narrow slot opening 36 between them.

Before folding the ends of the film toward the middle, the pills 40 are put in place. Then the two ends 32 of the film are folded toward the middle as indicated in Fig. 7. They do not quite meet, but there is a slot opening 36 formed between them. The areas 42 (Fig. 5), at the two edges of the folded film are sealed by applying heat and pressure. Simultaneously the cross areas 43 are sealed from one end of the chipboard 34 to the other end 34. Thus the pills are held in series. Any pill may be moved sideways to the slot 36 as shown, for example, in Fig. 5, but it is impossible for any pill to be moved from one series to the other because the various series are separated by the sealed areas 43.

Instead of using one piece of film in manufacturing such a container, the folded-over portions may be replaced by separate pieces.

The ends of the package illustrated in Figs. 5–7 are the same as in the package illustrated in Fig. 1. The flap 45 is folded down over the central area 46 before the package is closed. This closes the slot 36 and when the sides of the container are folded forward along the edges of the flap 45 it is impossible for any pill to be dispensed unintentionally or otherwise through the opening 36.

When one wants a pill he simply opens the package, lifts the flap 45 and then by a thumb or other finger moves one or more of the pills out through the slot opening 36.

Ordinarily all of the pills in the package will be identical, but this is not necessarily true. If a person is taking different pills, the pills of the different series may be different. For instance, all of the pills on one side of the package may be of one composition, and those on the other side of the package may be of a different composition. Alternatively, the pills may be arranged in a particular order. For instance, if a person is directed to take different pills alternately, first one and then the other, every other pill in each series may be different from the pills adjacent it, with the alternate pills identical to one another. The pills may be arranged in any desired order.

It is understood that various closure means may be substituted for the tongue and slot illustrated. Flaps such as the flaps 10 and 45 are not essential, but have been found to be highly desirable, especially in packages of the general type of those illustrated in Figs. 1–4. Although the drawings illustrate the enclosure of the pills in the film after a part of the film has been adhered to the backing, it is to be understood that the pills may be enclosed in the film and the film enclosure may be completed before it is attached to the backing. Instead of the flaps 10 and 45 extending from only one side of the backing, flaps may extend from opposite sides of the backing. Such flaps may be only about half as long as those that extend from only one side of the backing.

Although the invention has been described as relating to packages of pills for medication, other pills may be similarly packaged, such as pills of bluing, flower nutriments to be added to the earth in a flowerpot, bouillon cubes, etc.

What we claim is:

A closable package of pills, the container of which is formed of a relatively stiff backing and a film covering, in which container the pills are arranged in a plurality of separate series, each series being located in a separate passageway between the backing and the film covering, with a header passageway medially thereof and at right angles thereto connecting the various series but in which no pills are packaged and an opening in the film covering of the header passageway for dispensing pills therethrough, the backing being folded at a sharp angle on each side of the header passageway when the container is closed, whereby the entry of pills of the various series into the passageway is prevented.

References Cited in the file of this patent

UNITED STATES PATENTS

| | | |
|---|---|---|
| D. 138,698 | Salfisberg | Sept. 5, 1944 |
| 1,587,987 | Phelps | June 8, 1926 |
| 2,325,021 | Salfisberg | July 20, 1943 |
| 2,333,587 | Salfisberg | Nov. 2, 1943 |
| 2,347,509 | Salfisberg | Apr. 25, 1944 |
| 2,514,255 | Piazze | July 4, 1950 |
| 2,637,152 | Kraus | May 5, 1953 |
| 2,732,875 | Martin | Jan. 31, 1956 |

FOREIGN PATENTS

| | | |
|---|---|---|
| 338,513 | Great Britain | Nov. 17, 1930 |